UNITED STATES PATENT OFFICE.

OTTO B. MAY, OF NEW YORK, N. Y., ASSIGNOR TO MORGENSTERN & COMPANY, OF NEW YORK, N. Y., A CORPORATION OF NEW YORK.

OXYGEN-BATH.

969,073.  Specification of Letters Patent.  Patented Aug. 30, 1910.

No Drawing.    Application filed May 22, 1909.  Serial No. 497,658.

*To all whom it may concern:*

Be it known that I, OTTO B. MAY, a subject of the Emperor of Germany, residing in the city of New York, borough of Manhattan, county and State of New York, have invented certain new and useful Improvements in Oxygen-Baths, of which the following is a full, clear, and exact specification.

My invention relates to certain new and useful improvements in the administration of oxygen to the human system by means of baths, and especially to the production of substances designed, when brought into contact with water—preferably warm water as used for bathing purposes—to give off free oxygen.

It will be found that the chemical action of oxygen, especially in a nascent state, is very beneficial to the human system, being readily absorbed by the skin, as well as through the inhalation of the supernatant gas, and the innumerable oxygen bubbles arising from the bath in which the oxygen is being liberated exercise a very considerable mechanical action upon the nerves and muscles of the bather. It is desirable that the ingredients designed to produce these beneficial results shall not objectionably discolor the water of the bath, or leave any sediment which would stain or injure the skin, bath tub, towels, or other appurtenances of the bathroom. It is also desirable to have an even generation of oxygen for at least fifteen to twenty minutes, and I have found that I can produce a substance possessing all these characteristics and advantages.

In carrying out my invention I take a suitable quantity of an oxygen-yielding substance, such as perborate of sodium ($NaBO_3$. $4H_2O$), to which I add a suitable catalytic or substance capable of breaking up the hydrogen peroxid formed by dissolving the sodium perborate in water, and of liberating one molecule of oxygen per molecule of $H_2O_2$. I prefer to use as a catalyzer a salt of manganese, such, for instance, as manganese chlorid or manganese sulfate, although other salts may be found satisfactory. In using such a catalyzer as manganese or its salts, a great deal thereof has heretofore been required in order to decompose the aforesaid oxygen-yielding substance when dissolved in water in the short time occupied by the bath. This catalyzer, however, when used in the quantity heretofore thought necessary, produces a considerable discoloration of the bath and participates in the formation of compounds which are likely to stain and produce a disagreeable and objectionable precipitate. I have found, however, that full and rapid decomposition of the oxygen-bearing compounds in the bath can be obtained with a minimum quantity of catalyzer or oxidizer, if the latter be employed in a fine state of subdivision, and especially if mixed with or absorbed by some inert medium, such as kaolin, calcined magnesia, infusorial or other earths, pumice, etc. For example, in order to obtain a full liberation of oxygen from three hundred grams of sodium perborate in the bath within the time limit of say twenty minutes, there is ordinarily required fifteen grams of a pure manganese salt. This quantity renders the water exceedingly offensive in color, as above described; but by first mixing the manganese or other catalyzer with, or accomplishing its absorption by an inert material as above instanced, only a very small quantity—for instance, two grams or even less—of the catalyzer are required to obtain the same liberating effect, and the resulting discoloration is so slight as to be quite unobjectionable.

A number of different catalyzers may be employed without departing from the spirit of my invention, but I prefer to use manganese or the salts thereof, which prepared as set forth above, may be either mixed with sodium perborate or other oxygen-bearing substance, or kept separately until used. When the catalyzer and oxygen-bearing substance are mixed, however, it will be understood that they must be maintained perfectly dry to prevent chemical action taking place.

It is obvious that my invention is not confined to the exact details hereinabove pointed out and I do not mean to limit myself thereto, but

What I claim and desire to secure by Letters Patent is:.

1. A composition of matter of the character described, comprising means adapted, on contact with water, to set free hydrogen peroxid, a catalytic agent adapted to break up the hydrogen peroxid, and a finely divided insoluble inert carrier which is impregnated with said catalytic agent, said carrier adapted, upon chemical action between said peroxid and said catalytic agent, to retain said catalytic agent and prevent objectionable precipitation thereof and disagreeable discoloration of the bath liquid.

2. A composition of matter of the character described, comprising means adapted, on contact with water, to set free hydrogen peroxid, a manganese salt adapted to break up the hydrogen peroxid, and a finely divided insoluble inert carrier which is impregnated with the manganese salt before mentioned, said carrier being adapted to prevent discolorating of the water and objectionable precipitation of manganese peroxid.

3. A composition of matter of the character described, comprising means adapted, on contact with water, to produce hydrogen peroxid, in combination with manganese sulfate, a finely divided insoluble inert carrier which is impregnated with the manganese sulfate before mentioned, said carrier being adapted to prevent discoloring of the water by said manganese sulfate and objectionable precipitation of manganese peroxid.

In testimony whereof, I have hereunto set my hand in the presence of two subscribing witnesses.

OTTO B. MAY.

Witnesses:
ADOLPH F. DINSE,
HENRIETTA E. WORKMAN.